(No Model.)
S. T. WILLIAMS.
WHEEL.
No. 305,769. Patented Sept. 30, 1884.
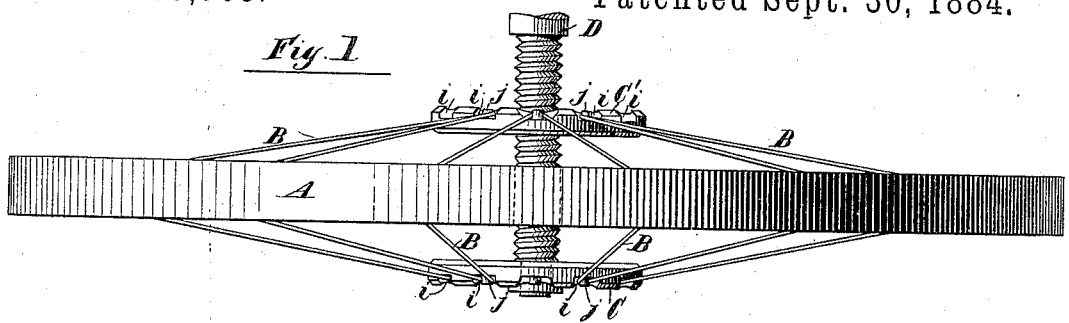
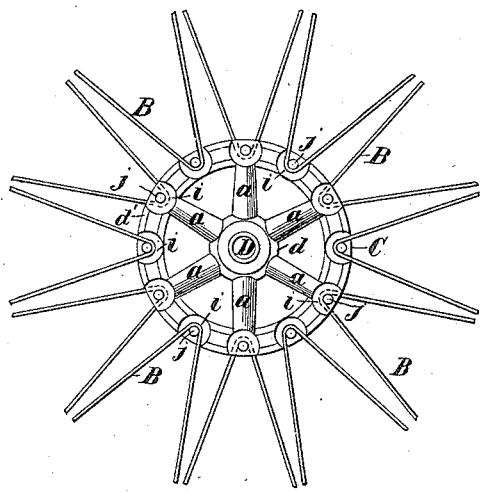
Witnesses:
Herbert Southwick
E. Kregeloh
Inventor:
Samuel T. Williams
By Ernest C. Webb
his Attorney

UNITED STATES PATENT OFFICE.

SAMUEL T. WILLIAMS, OF RED BANK, ASSIGNOR TO THE WILLIAMS TENSION WHEEL COMPANY, OF NEWARK, NEW JERSEY.

WHEEL.

SPECIFICATION forming part of Letters Patent No. 305,769, dated September 30, 1884.

Application filed February 14, 1884. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

This invention is one of several forms of wheels the principle of which is illustrated and an embodiment thereof claimed in my parent application for Letters Patent therefor, filed February 1, 1883, Serial No. 83,695.

The invention herein consists, particularly, in the construction of the hub and the combination therewith of the wire spokes.

In the accompanying drawings, in the two figures of which similar letters of reference indicate like parts, Figure 1 is a top plan view of my wheel, and Fig. 2 is a side elevation of the hub and part of the spokes.

A is the rim, similar to that shown in the application above referred to.

The hub, as before, is composed of parallel halves C C', in one of which the axle D is swiveled after its threaded nib is engaged with the threaded hub of the other. Each of these hub-halves has the center annulus, $d$, outer rim, $d'$, and connecting-spokes $a$, thus resembling a wheel. The outer faces of the rims $d'$ $d'$ of the halves C C' of the hub are provided with a series of recesses, $i$, in each of which is a pin, $j$, projecting at right angles, or nearly so, from the said rims.

The spokes B are formed of a continuous wire, attached by being passed through holes in the felly, (such as shown in the invention before referred to,) and then inserted in the recesses $i$ consecutively and bent around the projections $j$, the two ends of the wire meeting at the finish and being suitably joined. The wire extends from one half of the hub through the rim or felly to the other half of the hub, and back again through the next hole to the next recess and pin on the first half, and so on till all the pins have been engaged. Tension is produced, increased, or diminished, or entirely taken off, by varying the space between the halves of the hub, as in the invention before named—that is to say, by lateral movement of the wire hub-halves holding the wire one from the other. By recessing the hub-halves at $i$ on their outer faces and placing pins $j$ therein such pins may be, and in this instance are, wholly within said recesses, so that their heads are flush with the surface of the hub-faces, and hence neither the wire nor the pins afford projections, as heretofore, liable to injury, while at the same time the wire is freely accessible and can be inserted and removed with facility, there being no clamping of the wire between plates, and no threading of it around pins secured transversely in holes in the hub, as in other instances.

What I claim as my invention, and desire to secure by Letters Patent, is—

The combination, with the rim, the two-part hub, and the screw-threaded axle-nib engaging the parts of the hub to vary their proximity by lateral movement, of the pins $j$, wholly contained in recesses $i$ in the faces of the hub, and the continuous wire connecting the rim and the hub, and engaging the pins and lying within the recesses surrounding them, as shown and described.

In testimony whereof I have hereunto set my hand this 9th day of February, A. D. 1884.

SAMUEL T. WILLIAMS.

Witnesses:
 ARTHUR C. WEBB,
 ERNEST C. WEBB.